Jan. 22, 1946.   J. MARTIN   2,393,547
HINGED MOUNTING FOR CONTROL MEMBERS OF AIRCRAFT
Filed June 6, 1942.   5 Sheets-Sheet 1

Inventor
J. MARTIN.
per. Rayner Ho
Attorneys

Jan. 22, 1946.  J. MARTIN  2,393,547
HINGED MOUNTING FOR CONTROL MEMBERS OF AIRCRAFT
Filed June 6, 1942  5 Sheets-Sheet 2
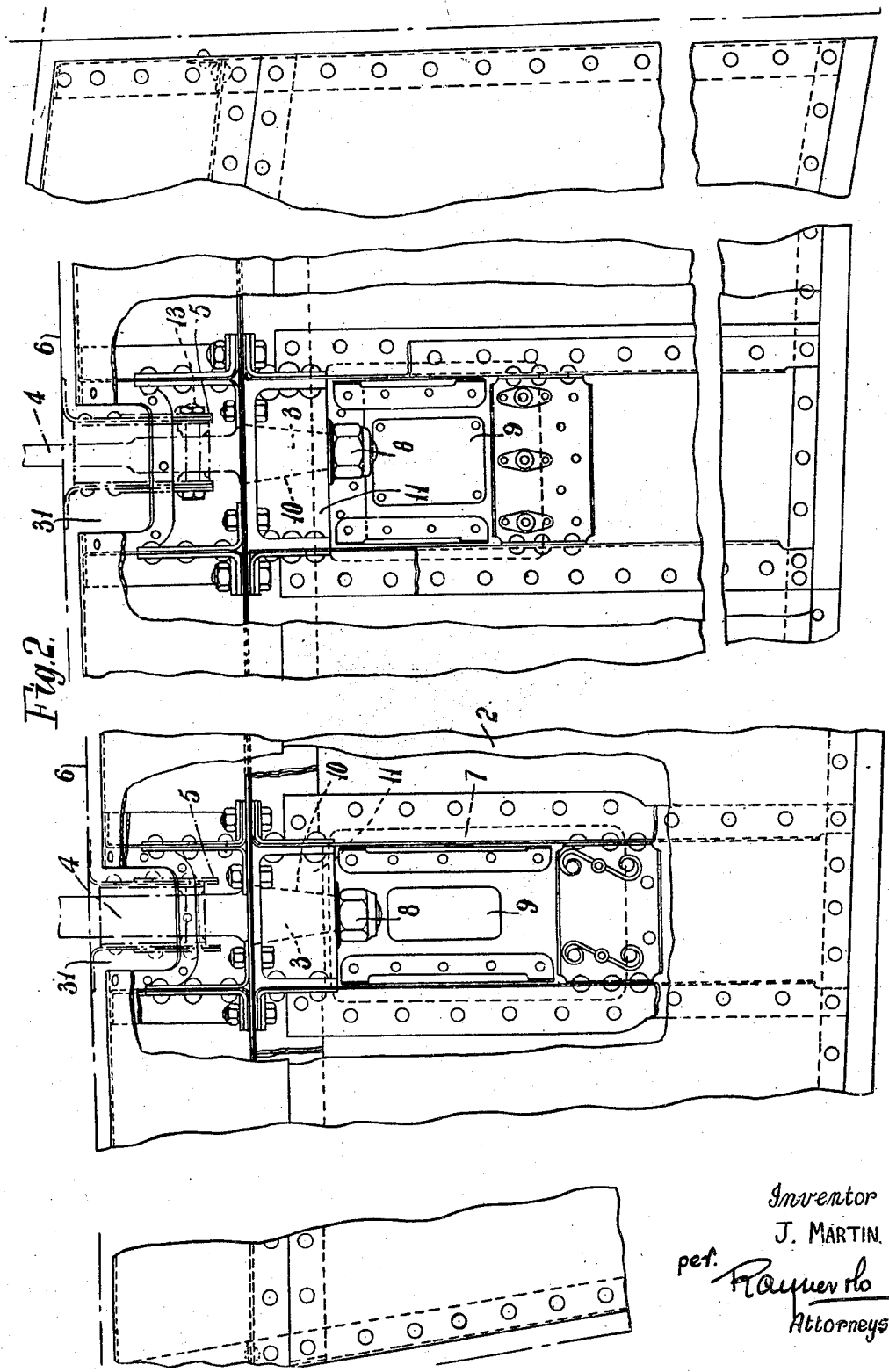

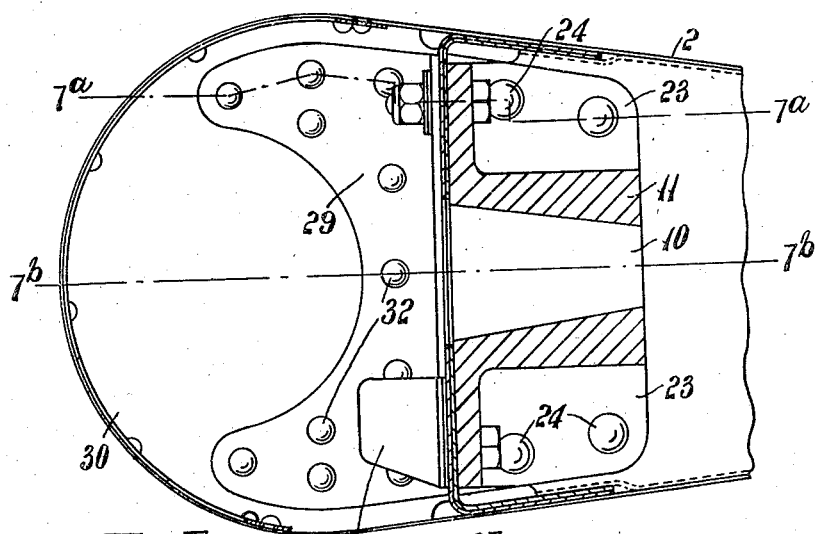
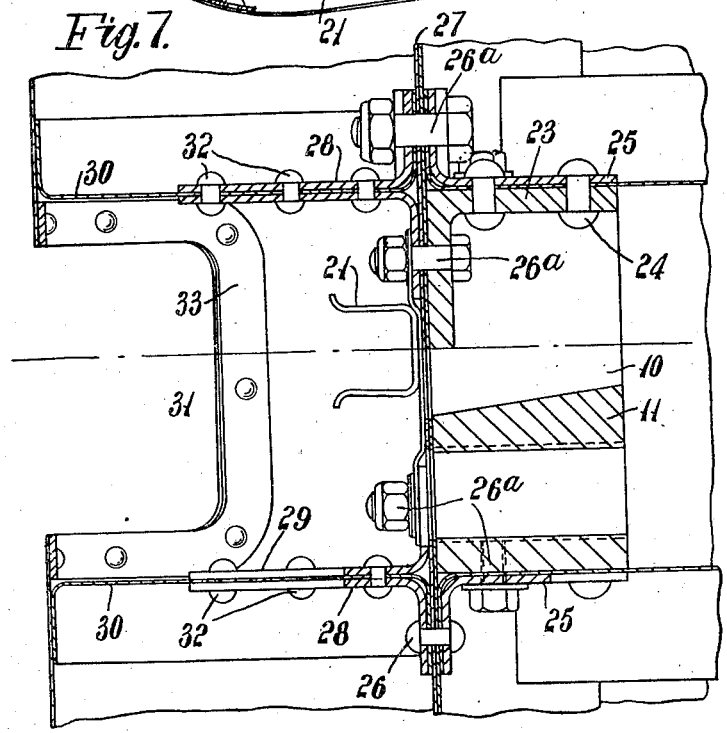

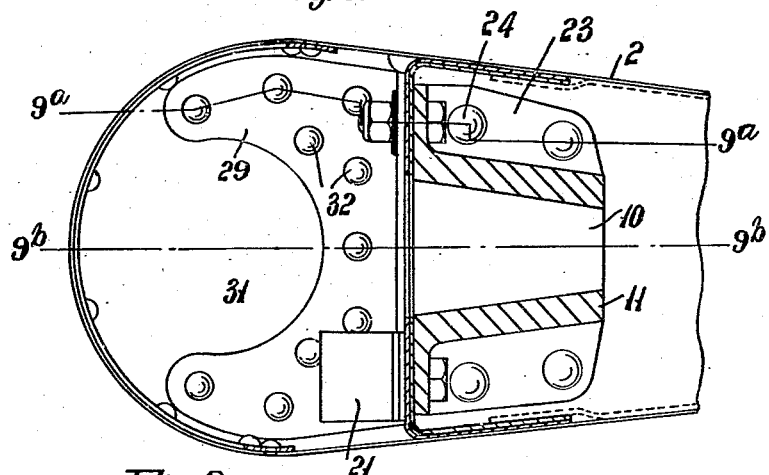
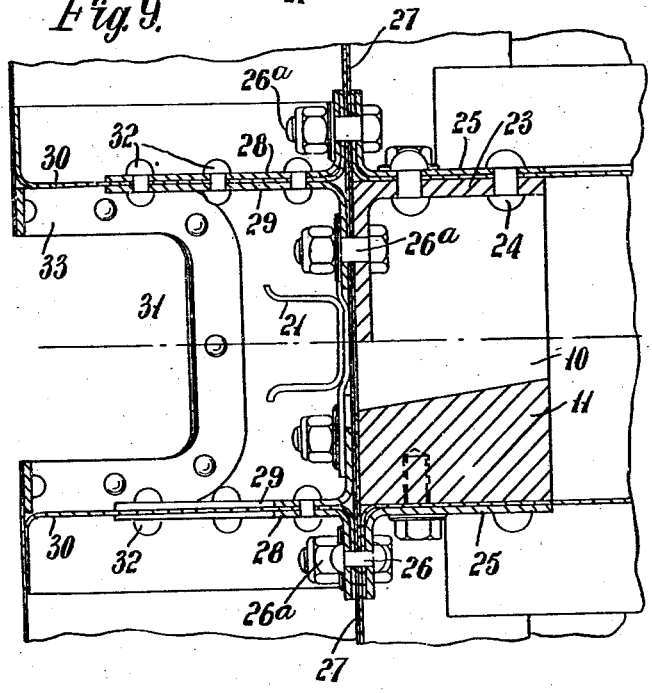

Patented Jan. 22, 1946

2,393,547

UNITED STATES PATENT OFFICE 2,393,547

HINGED MOUNTING FOR CONTROL MEMBERS OF AIRCRAFT

James Martin, Higher Denham, near Uxbridge, England

Application June 6, 1942, Serial No. 446,137
In Great Britain February 26, 1942

3 Claims. (Cl. 244—90)

This invention relates to an improved manner of mounting ailerons and the like and also an improved form of hinge for such purpose. The present methods of hinging ailerons to the wings of aircraft entail protracted and complicated operations in mounting and removing the ailerons, and especial care has to be taken to ensure proper coaxial alignment of the hinge elements of an aileron and the connection of the control elements thereof to ensure smooth working and absence of strained joints. The chief object of this invention is to provide a manner of mounting an aileron or like mounted control member and a form of hinge by means of which a sturdy and simple form of connection is made between aileron and wing or other equivalent parts which obviates the necessity of disassembling the hinges or of interfering with the aileron or equivalent controls when removing an aileron or like member and also enables an aileron or like member to be fitted and removed very rapidly by the simplest of mechanical operations without upsetting the alignment of the hinge axes or the adjustments for mass and aerodynamic balancing. Another object of this invention is to provide a form of hinge and bracket therefor which can be fitted by a simple operation as a unit to a wing or other appropriate part independently of the aileron or the like so as to simplify assembly, and a still further object of the invention is to provide with such a hinge means for self-aligning co-operation with another like hinge for the aileron or the like. Although the invention will be described hereinafter as applied to an aileron it can under suitable conditions be applied to flaps, elevators and rudders.

In this invention the manner of mounting a hinged control member of aircraft such as an aileron, flap, elevator and rudder (hereinafter referred to as an aileron), consists in fitting the aileron readily detachably to the oscillatable parts of the aileron hinges which are actuated from the controls so that said parts remain connected to the wing intact with the remainder of the parts of the hinges without interfering with the connection to the controls when the aileron is removed, and without disassembling the hinges. This manner of connection is such that when, as is usual with ailerons, mass balancing is adopted, the balancing means is not interfered with when detaching the aileron, so that proper mass balancing is ensured when replacing the aileron.

The construction of hinge according to this invention for effecting said manner of connection comprises a lever arm pivoted between its ends to means adapted to comprise a normally permanent fixture on the wing, one end of said lever being adapted to project into the wing for connection to a control or balance weight, and the other end of the lever comprising a spigot adapted to be readily detachably engaged in a relatively solid or fixed manner in a retaining member in the aileron and to be fastened solidly or rigidly in relation to said retaining member without interfering with the connection of the lever arm to its controlling means or balance weight.

The said spigot is preferably a tapered or coned head on the appropriate end of the said lever, the said retaining member on the aileron having a tapered socket to receive the spigot and screw or other means is provided for clamping the spigot in the socket. As an alternative the sockets may be provided on the movable parts of the hinges and the ailerons may carry the spigots to engage therein, clamping screws being provided to secure them together.

In order that this invention may be clearly understood and readily carried into effect drawings are appended hereto illustrating an embodiment thereof, and wherein:

Fig. 2 is a plan view of the aileron broken away or opposite sides of both of the hinges.

Fig. 6 is a detail sectional elevation showing the fitment on the aileron which receives the appropriate hinge member at the inboard end of the aileron when the aileron is connected to the wing.

Fig. 7 is a sectional plan view of Fig. 6 the upper half of this figure being a section on the line 7a—7a and the lower half a section on the line 7b—7b of Fig. 6, and Figs. 8 and 9 are views similar to Figs. 6 and 7 respectively of the outboard hinge the appropriate sections of Fig. 9 being on the lines 9a—9a and 9b—9b of Fig. 8.

Figure 1:
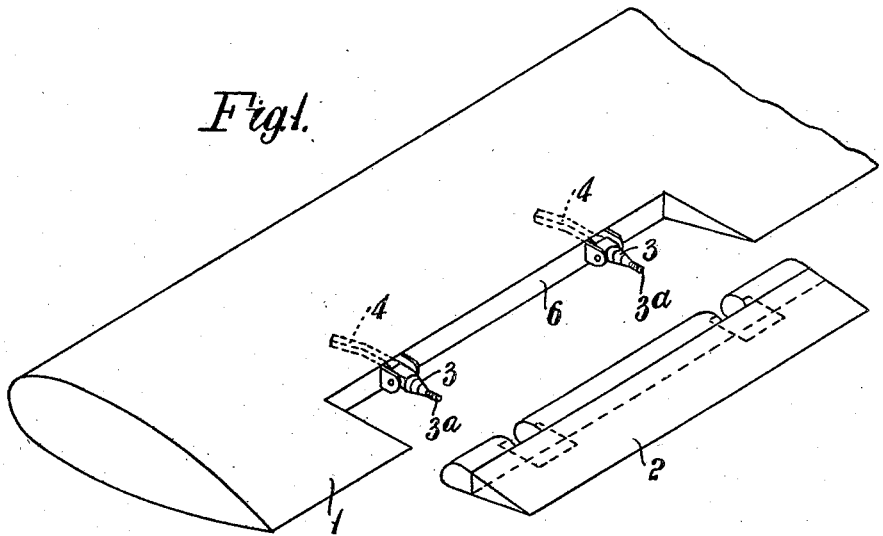
Fig. 1 is a somewhat diagrammatic broken perspective view showing the aileron detached from the wing.

Referring to the drawings the wing is indicated by the reference numeral 1 and the aileron by the reference numeral 2. As will be seen by reference to Fig. 1 the aileron is detachable from two spigots 3, and these spigots comprise the trailing ends of two levers 4 which oscillate on a common axis between two pairs of angle brackets 5 fixed to the rear face of the rear spar 6 (or other convenient part) of the wing 1. The only mechanical operation required to free the aileron for removal is the removal of a nut 8 (see Fig. 2) from each spigot 3, and access to such nuts is facilitated by the provision in the aileron of two rectangular apertures 7 in the base of the aileron, such two apertures normally being closed by cover plates 9 and being located in juxtaposition to and beneath the rear ends of the said spigots 3 which are threaded as at 3a to receive the nuts. Firm location of the ailerons on the two spigots 3 is ensured by tapering or coning each spigot as shown and forming a correspondingly tapered aperture 10 in each metal block 11 fixed in the aileron and adapted to form sockets to receive the spigots, each nut 8 with its washer abutting against the rear face of each block 11.

The two levers 4 carrying at their rear ends the spigots 3 can be adapted at their front ends to balance or partly balance the mass of the aileron, and each has a widened central part 4b apertured cylindrically to receive a ball bearing 12 forming an anti-friction fulcrum or pivot, the centre ring of the bearing 12 being disposed about a centre bolt 13 also passed through the appropriate pair of angle side brackets 5, the lateral flanges of which are secured by bolts 15 to the rear face of the rear spar 6 or other convenient part of the wing, which spar is cut away as at 14 to receive the lever 4, such bolts 15 also passing through stiffening angle brackets 17 riveted to fore and aft ribs 18 inside the wing. The front end of each lever 4 is apertured as at 4a or otherwise adapted to receive the usual control cable or rod and any necessary balance weights. In the arrangement shown in Fig. 2 the inboard lever 4 is adapted to be connected to the aileron control and the outboard lever is intended to carry a balance weight. The side brackets 5 are braced by upper and lower bridge pieces 19 riveted by flanged ends to the brackets 5, these bridge pieces also affording some protection to the bearings 12 and if desired acting as stops for the lever 4 to limit the movements of the aileron. Distance piece collars 20 are interposed between the ball bearing and the side brackets 5 and stiffening plates 5b are riveted to these brackets.

Figure 5:
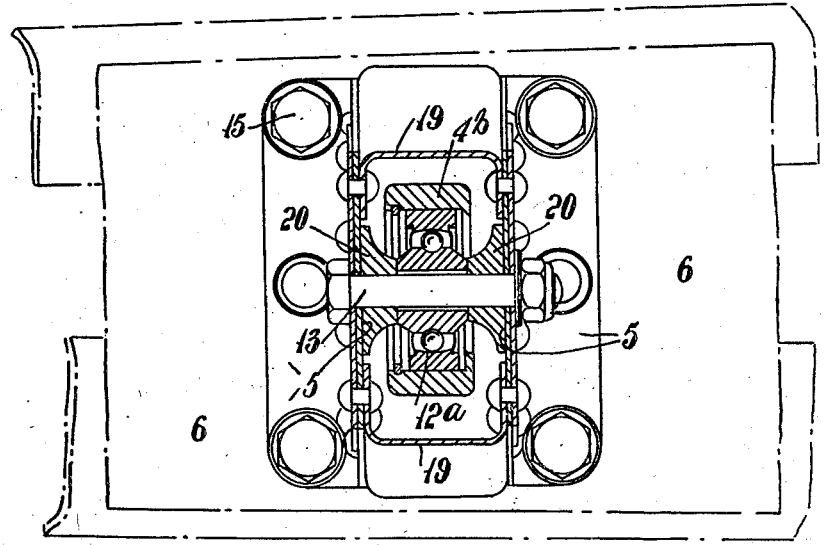
Fig. 5 is a section on the line 5a—5a of Fig. 3.
Figure 3:
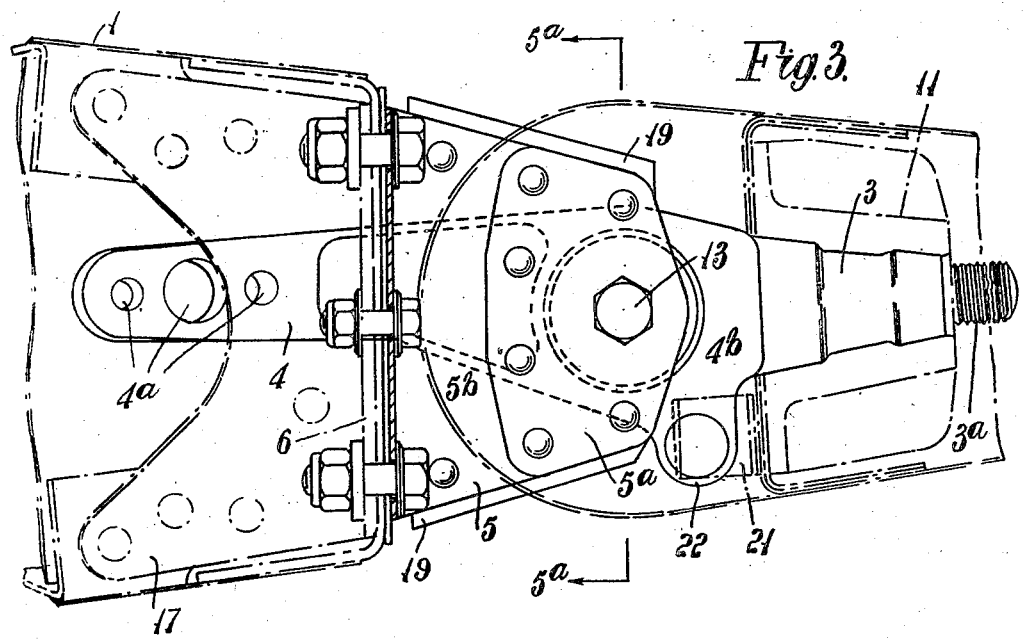
Fig. 3 is a side elevation view to a larger scale of one of the aileron hinges.
Figure 4:
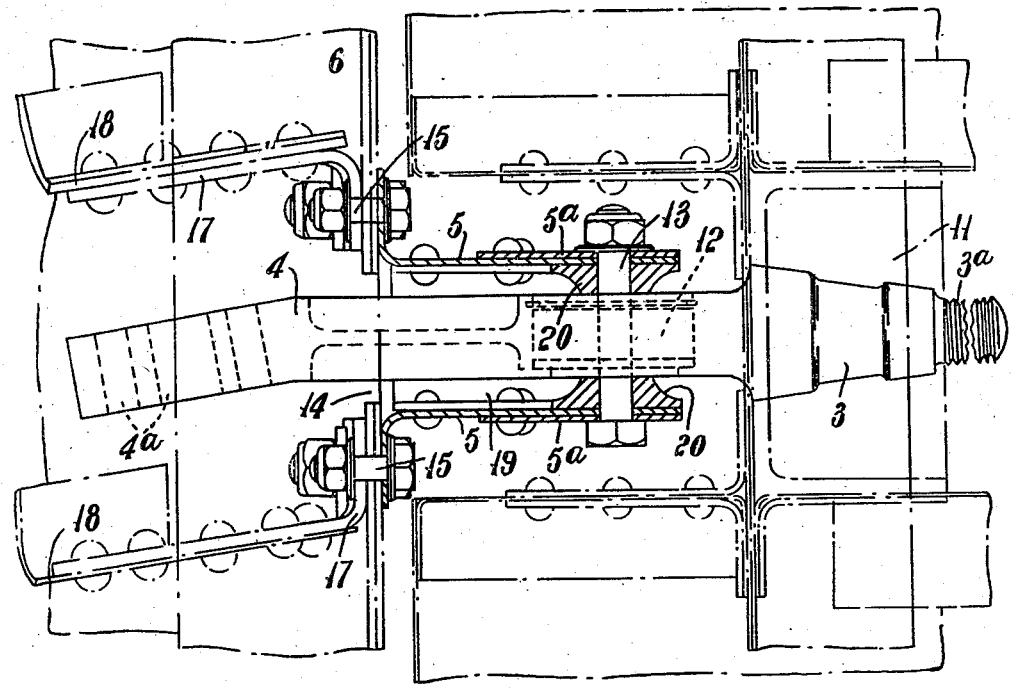
Fig. 4 is a part sectional plan view of Fig. 3.

To compensate for any slight misalignment of the axes of the two hinges connecting the aileron to the wing the ball bearings 12 are of the self-aligning type, their outer races being radiused as at 12a (see Fig. 5). Also to ensure that the lever 4 is correctly positioned in relation to the rear spar of the wing and also in relation to the aileron particularly laterally in relation to the wing or the aileron and also to serve as a quick guide as to the proper way of replacing the aileron each socket member 11 in the aileron has fixed in relation thereto a resilient U-shaped locating clip 21 subjacent to and symmetrical in plan with the axis of the aperture 10, and when assembling the hinge and aileron, this clip is adapted to engage as a close sliding fit with a lug 22 depending from the lever 4 in proximity to its fulcrum. Each clip 21 has flared free ends as shown in Fig. 7 to facilitate correct engagement with the appropriate lug 22. This ensures that the levers 4 will be maintained in a median position on their self-aligning bearings when mounting the aileron on the spigots 3 of the levers 4.

It will be apparent that each of the two hinges of the aileron is a unitary assembly which remains intact and coupled to the appropriate control means whether or not the aileron is attached to the wing, so that the mounting and removal of the aileron does not affect the setting of the controls and also the pivots of the levers will be correctly located at all times and will not be liable to be upset by unskilled or negligent work in affixing and removing the aileron. Also the engagement of the spigots 3 in the socketed blocks 11 provides a solid connection between the levers and the blocks, the blocks 11 being rigidly fixed in the aileron.

This rigid fixing of the blocks 11 can be effected by end flanges 23 thereon being fixed by rivets 24 to angle brackets 25 which are also secured by rivets 26 and locating bolts 26a to a spar or frame member 27 of the aileron, these latter rivets also securing a pair of flanged cheek plates 28 to the aileron frame or spar member 27 so that they may co-operate with another pair of like cheek plates 29 in securing side panels 30 of a bay 31 in the front edge of the aileron to accommodate the lever 4, rivets 32 securing the two pairs of cheek plates together. A reinforcing frame 33 strengthens the rim of this bay in the skin of the front edge of the aileron.

In addition to the simplicity and sturdiness of the beforesaid construction of hinge there is the advantage that once the mass balancing has been fixed there is no necessity to interfere therewith with removing and affixing an aileron so that the predetermined centre of gravity of the aileron can be maintained. In this connection the invention can be adopted for pivotally supporting elevators, rudders, or flaps, an advantage particularly with rudders being that by mounting the hinge on the fin structure the aerodynamic balance of the rudder once fixed will be maintained in the same manner as the mass balancing of the ailerons.

A control member such as an aileron, elevator, rudder or other part mounted in accordance with this invention may be readily removed for repair, inspection or replacement without interfering with the adjustment or proper working of the hinge connection or of the operating controls or any balance weights or other devices which may be provided. The operation of demounting and remounting an aileron or other part is greatly simplified and these operations can be very quickly carried out.

I claim:

1. A pivot mounting for a control surface on a wing of an aircraft, which permits rapid detachment of the control surface without disturbing the control mechanism or adjustments for mass and aerodynamic balancing, comprising, in combination, a pivot support rigidly mounted on a rear side of a wing of the aircraft in the form of a bracket having two rearwardly extending arms, the arms supporting a center bolt disposed perpendicularly between them, a unitary lever having rearwardly and forwardly extending arms and having a cylindrical aperture disposed in a central portion, pivotably mounted at said central portion upon said center bolt, a self-aligning ball bearing disposed in said aperture between said center bolt and said lever, providing an anti-friction fulcrum for the lever, the forwardly extending arm of said lever adapted to carry a weight to balance at least in part the weight of said control surface and projecting into the interior of the aircraft to engage a control means, the rearwardly extending arm of said lever having a tapered portion at the end which terminates in a threaded portion adapted to receive a nut, said tapered portion detachably inserted in and through and rigidly engaging a block fixedly mounted on said control surface, said block having a tapered socket open at each of its ends adapted to snugly receive said tapered portion, a nut threaded on said terminal portion of the arm and abutting against the rear face of said block, a lug member depending from said rearwardly extending arm adjacent the fulcrum of the lever, a resilient U-shaped clip having flared free ends fixedly mounted upon said control surface subjacent to and in the vertical plane of the tapered socket in said block, adapted to slidably engage said lug member when inserting said rearwardly extending arm in said socket, guiding said arm into the correct position, whereby actuation of said lever by said control means oscillates the control surface by causing the control surface and the forwardly and rearwardly extending arms of the lever to describe an arc about said pivot support.

2. A pivot mounting in accordance with claim 1, in which the pivot support comprises angle brackets whose lateral flanges are secured to the rear side of the wing.

3. A pivot mounting in accordance with claim 1, in which the pivot support carries abutments adapted to limit the movement of the lever.

JAMES MARTIN.